United States Patent
Peron et al.

(10) Patent No.: US 6,978,864 B2
(45) Date of Patent: Dec. 27, 2005

(54) WHEELCHAIR BRAKING DEVICE

(76) Inventors: Jim Peron, 3855 Slusaric Rd., North Tonawanda, NY (US) 14120; Jonathan Leahy, 2 Peters Cir., West Seneca, NY (US) 14224; Steven Dobbens, 3102 N. 725 West, LaPorte, IN (US) 46350

( * ) Notice: Subject to any disclaimer, the term of this patent is extended or adjusted under 35 U.S.C. 154(b) by 0 days.

(21) Appl. No.: 10/605,485

(22) Filed: Oct. 2, 2003

(65) Prior Publication Data

US 2004/0104081 A1     Jun. 3, 2004

Related U.S. Application Data

(60) Provisional application No. 60/319,590, filed on Oct. 2, 2002.

(51) Int. Cl.[7] .............................................. B60T 1/00
(52) U.S. Cl. ........................ 188/2 F; 188/265; 188/29; 188/109
(58) Field of Search ............................ 188/2 F, 26, 27, 188/265, 29, 31, 109

(56) References Cited

U.S. PATENT DOCUMENTS

| | | | |
|---|---|---|---|
| 2,753,919 A * | 7/1956 | Sill .............................. | 188/27 |
| 4,322,093 A * | 3/1982 | Otto ............................ | 188/2 F |
| 5,036,959 A * | 8/1991 | Sarro .......................... | 188/2 F |
| 5,203,433 A * | 4/1993 | Dugas ......................... | 188/2 F |
| 5,894,912 A * | 4/1999 | Dobben ....................... | 188/2 F |
| 6,264,007 B1 * | 7/2001 | Norton et al. .............. | 188/2 F |
| 6,655,503 B1 * | 12/2003 | Moody ........................ | 188/2 F |

* cited by examiner

*Primary Examiner*—Melanie Torres
(74) *Attorney, Agent, or Firm*—Gary M. Hartman; Domenica N. S. Hartman; Hartman & Hartman

(57) ABSTRACT

A wheelchair braking device providing a braking action that automatically disengages when an occupant is seated in the wheelchair. The braking device includes a support structure to which a sensing lever is pivotably mounted and to which a braking arm is slidably mounted. A biasing element is coupled to the braking lever to bias the braking arm in a first direction relative to the support structure and into engagement with a wheel of the wheelchair, thereby inhibiting rotation of the wheel. The sensing lever and braking arm are interconnected such that the biasing element operates through the braking arm to bias the sensing lever in an upward direction against the wheelchair seat. The interconnection between the sensing lever and braking arm causes the braking arm to disengage from the wheel when the sensing lever rotates in a downward direction.

19 Claims, 1 Drawing Sheet

WHEELCHAIR BRAKING DEVICE

CROSS REFERENCE TO RELATED APPLICATIONS

This application claims the benefit of U.S. Provisional Application No. 60/319,590, filed Oct. 2, 2002. In addition, this application is related to commonly-assigned U.S. Pat. No. 5,894,912, the contents of which are incorporated herein by reference.

BACKGROUND OF INVENTION

1. Field of the Invention

The present invention generally relates to braking devices for wheelchairs and similar vehicles. More particularly, this invention relates to a wheelchair braking device having an uncomplicated construction that can be installed on conventional wheelchairs, and which provides a braking action that automatically disengages when an occupant is seated in the wheelchair.

2. Description of the Related Art

Wheelchairs are generally equipped with a brake mechanism to enable the user to more safely enter and leave the seat of the wheelchair. Conventional braking mechanisms typically consist of a pair of levers, each engaging the exterior of one of the larger wheels of the wheelchair. To immobilize the wheelchair, the levers must be manually operated to engage the wheels. While such brake mechanisms are reliable, the operator or user of a wheelchair may forget to engage the lever prior to entering or leaving the seat. If the wheelchair is not properly immobilized by the brake, there is a significant risk of the user falling while trying to stabilize him or herself when entering or leaving the wheelchair.

In response, the prior art has suggested various automatic braking systems for wheelchairs. U.S. Pat. Nos. 3,529,700 to Marshall, U.S. Pat. No. 4,320,818 to Knoche, U.S. Pat. No. 4,623,043 to Babilas, and U.S. Pat. No. 5,203,433 to Dugas teach mechanical braking systems that automatically engage when the user rises off the wheelchair seat. However, these braking mechanisms are relatively complicated and/or require considerable modification to the wheelchair. The use of solenoids to engage and disengage a spring-biased braking lever or pin has also been suggested, as disclosed in U.S. Pat. No. 5,358,266 to Roth et al. However, solenoids and batteries sufficiently powerful to overcome the spring force contribute significantly to the cost of the wheelchair.

An improved wheelchair braking device that overcomes the aforementioned disadvantages is disclosed in commonly-assigned U.S. Pat. No. 5,894,912 to Dobben. Dobben makes use of a lever that senses whether the wheelchair seat is occupied, and a pivoting braking lever biased into engagement with a wheel of the wheelchair to prevent rotation of the wheel and therefore inhibit movement of the wheelchair. The sensing and braking levers are interconnected such that when the wheelchair is occupied, the sensing lever causes the brake lever to rotate out of engagement with the wheel, allowing movement of the wheelchair.

From the above, it can be seen that Dobben provides an automatic braking mechanism that has a relatively uncomplicated and inexpensive construction, and can be readily mounted to a conventional wheelchair without interfering with the operation of the wheelchair. Even so, further improvements would be desirable.

SUMMARY OF INVENTION

The present invention provides a wheelchair braking device that includes a support structure to which a sensing lever is pivotably mounted and to which a braking arm is slidably mounted. A biasing element is coupled to the braking lever to bias the braking arm in a first direction relative to the support structure. When the braking device is mounted to a wheelchair, the biasing element biases the braking arm into engagement with a wheel of the wheelchair, thereby inhibiting rotation of the wheel. The sensing lever and braking arm are interconnected such that the biasing element operates through the braking arm to bias the sensing lever in an upward direction, corresponding to a brake engagement position for the sensing lever. As such, the interconnection between the sensing lever and braking arm causes the braking arm to move in a direction opposite to the first direction, thereby disengaging the braking arm from the wheel, when the sensing lever is caused to rotate in a downward direction, corresponding to a brake disengagement position for the sensing lever.

To fully immobilize a wheelchair, two braking devices in accordance with this invention are preferably installed, with each braking device being dedicated to brake one of the large wheels of the wheelchair. From the above description, it can be appreciated that the automatic braking capability of the braking device can be achieved with minimal additional hardware, and does not require physical modification of an existing wheelchair structure. As such, the braking device of this invention offers a relatively inexpensive accessory that can be readily retrofitted to most existing wheelchairs.

Other objects and advantages of this invention will be better appreciated from the following detailed description.

BRIEF DESCRIPTION OF DRAWINGS

The present invention will be described, by way of example, with reference to the accompanying FIG. 1, which shows a wheelchair braking device mounted to a wheelchair in accordance with a preferred embodiment of this invention.

DETAILED DESCRIPTION

Figure 1:
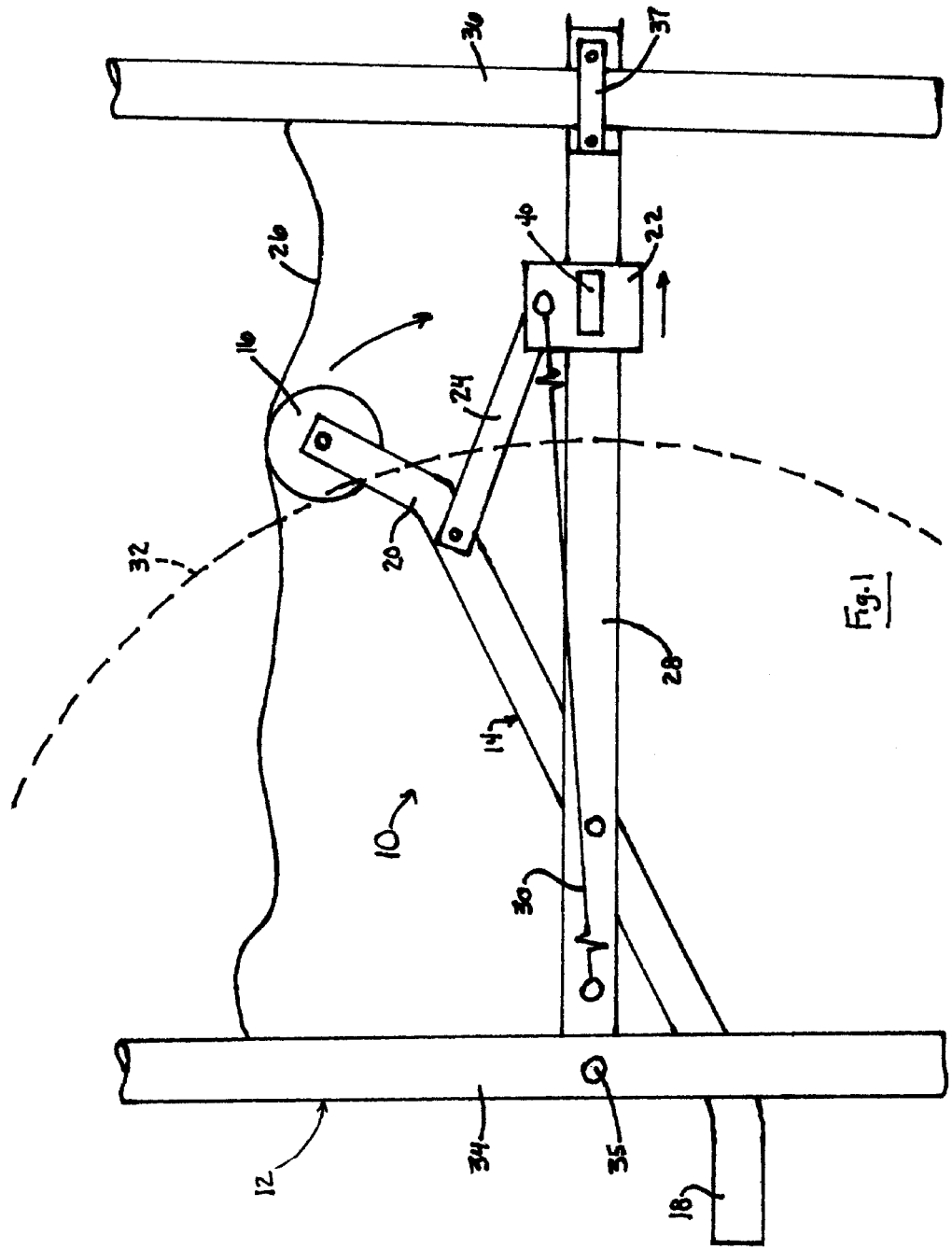

A wheelchair braking device 10 in accordance with a preferred embodiment of this invention is illustrated in FIG. 1. As shown, the braking device 10 is mounted to a conventional wheelchair 12, whose structure and components need not be modified or removed to accommodate the braking device 10. As such, the braking device 10 is configured to be mountable to essentially any conventional wheelchair, including those designed to be collapsible.

Though a single braking device 10 is shown, two units of the braking device 10 shown in FIG. 1 are intended to be installed on the wheelchair 12, one on each side of the wheelchair 12 to operate on one of two larger wheels 32 (one of which is shown in phantom). Each device 10 includes a support bar 28 oriented in a fore-aft (longitudinal) direction of the wheelchair 12. The bar 28 is secured to aft and fore vertical frame members 34 and 36 of the wheelchair 12, such as with a fastener 35 as shown for the aft frame member 34 and a clamp 37 at the fore frame member 36. A variety of other fastening devices and techniques could be used to secure the bar 28 to the frame members 34 and 36.

Each braking device 10 is shown as further including a sensing lever 14 and a braking block 22 and brake arm 40.

The sensing lever is 14 are shown as being pivotably mounted near a rearward end of the support bar 28, while the braking block 22 is shown as being slidably mounted on a forward portion of the support bar 28. The sensing lever 14 is mounted to pivot about a horizontal axis oriented in a lateral direction relative to the wheelchair 12. A forward end 20 of each sensing lever 14 is equipped with a horizontal bar 16 so as to be positioned directly beneath the seat 26 of the wheelchair 12. Because of the pliable nature of the seat 26 and the manner in which the bar 16 is urged into contact with the seat 26 as explained below, the bar 16 is raised into a raised "engaged" position when the seat 26 is unoccupied, and is lowered along with the seat 26 into a lowered "disengaged" position when the seat 26 is occupied, the latter of which is indicated by the arrows in FIG. 1.

When the sensing lever 14 is in its raised engaged position, the rearward end 18 of the sensing lever 14 is generally oriented in a downward position while the forward end 20 of the sensing lever 14 is in a raised position, as shown in FIG. 1. A link 24 serves to interconnect the sensing lever 14 with the braking block 22. From FIG. 1, it can be seen that the braking block 22 is mounted to the support bar 28 so as to slide along the length of the bar 28 in the fore-aft direction of the wheelchair 12. The brake arm 40 extends laterally outward from the braking block 22 (out of the plane of FIG. 1) in order to engage the wheel 32 of the wheelchair 12 when the braking block 22 is moved rearward. A coil spring 30 is shown as being secured to the braking block 22 to urge the brake arm 40 rearward and into engagement with the wheel 32. To maintain a modular construction for the device 10, the spring 30 is preferably attached to a rearward portion of the support bar 28 as shown in FIG. 1, though it is foreseeable that the spring 30 could be secured directly to the wheelchair 12. Furthermore, it is foreseeable that other suitable biasing elements could be substituted for the spring 30.

With the above arrangement, the link 24 interconnects the sensing lever 14 with the braking block 22. As indicated by the arrows in FIG. 1, the link 24 pushes forward on the braking block 22 and disengages the brake arm 40 from the wheel 32 when the bar 16 of the sensing lever 14 is rotated downwardly into the disengaged position, corresponding to when the seat 26 of the wheelchair 12 is occupied. Conversely, if the bar 16 of the sensing lever 14 is allowed to rotate upwardly into the engaged position, corresponding to the seat 26 being unoccupied, the forward end 20 of the sensing lever 14 is allowed to rotate upward under the force of the spring 30 which also causes the braking block 22 to slide rearwardly and engage the brake arm 40 with the wheel 32.

As disclosed in U.S. Pat. No. 5,894,912 to Dobben, the braking device 10 of this invention may further include a pair of hand levers (not shown) that enable the brake arm 40 of each unit to be disengaged with its wheel 32. Each hand lever is mounted to a handle of the wheelchair and interconnected with the rearward ends 18 of the sensing levers 14, such as with a chain or cable. With this configuration, actuation of the hand levers 20 rotates the rearward ends 18 of the sensing levers 14 upward, causing the forward end 20 of each sensing lever 14 to rotate downward, pushing the braking block 22 forward and disengaging its brake arm 40 from its wheel 32.

From the above, the efficient and uncomplicated operation of the braking device 10 of this invention can be readily appreciated. Whenever the wheelchair 12 is occupied, the seat 26 is urged downward and the sensing lever 14 is rotated into its disengaged position, overcoming the biasing action of the springs 30 that would otherwise cause the brake arm 40 to engage the wheel 32. As the occupant rises from the seat 26, the sensing lever 14 is caused to rise with the seat 26 under the influence of the spring 30 operating through the braking block 22 and link 24, which in turn causes the brake arm 40 to engage the wheel 32. In addition to its uncomplicated operation, the braking device 10 can also be seen to have an uncomplicated construction, which promotes the ease with which the braking device 10 of this invention can be installed on essentially any conventional wheelchair. As an example, the braking device 10 is compatible with a collapsible wheelchair. As the wheelchair is collapsed, each unit of the braking device 10 remains secured between the frame members 34 and 36 of the wheelchair 12. The configuration of the bars 16 of the sensing levers 14 allow the wheelchair to be collapsed without the bars 16 interfering with each other or the structure of the wheelchair 12.

While the invention has been described in terms of a preferred embodiment, it is apparent that other forms could be adopted by one skilled in the art. For example, other elements could be substituted for those shown as providing the rotational and sliding components and interconnections of the braking device 10. In addition, the shapes and relative orientations of the components could be other than that shown, and the braking device 10 could be adapted to mount to wheelchairs that differ from that shown in FIG. 1. Accordingly, it should be understood that the invention is not limited to the specific embodiment illustrated in the Figure. It should also be understood that the phraseology and terminology employed above are for the purpose of disclosing the illustrated embodiment, and do not necessarily serve as limitations to the scope of the invention.

What is claimed is:

1. A wheelchair braking device for a wheelchair having a seat and a wheel, the wheelchair braking device comprising:
    a support structure;
    a sensing lever pivotably mounted to the support structure for rotational movement in oppositely-disposed first and second rotational directions, the sensing lever comprising means for engaging the seat of the wheelchair, the engaging means being adapted to rotate upward into engagement with the seat when the support structure is mounted to the wheelchair and the sensing lever is pivoted in the first rotational direction;
    braking means slidably mounted to the support structure for movement in oppositely-disposed first and second linear directions;
    means for biasing the braking means in the first linear direction; and
    means for interconnecting the sensing lever and the braking means, the interconnecting means comprising a link pivotably connected at a first end thereof to the sensing lever and pivotably connected at a second end thereof to the braking means, the interconnecting means causing the biasing means to bias the sensing lever in the first rotational direction, the interconnecting means causing the braking means to move in the second linear direction when the sensing lever is caused to rotate in the second rotational direction.

2. The wheelchair braking device according to claim 1, wherein the support structure comprises a bar having a longitudinal length terminating with oppositely-disposed first and second ends, each of the first and second ends having means for attaching the bar to a wheelchair.

3. The wheelchair braking device according to claim 2, wherein the sensing lever is pivotably mounted to the bar so as to rotate about an axis transverse to the longitudinal length of the bar.

4. The wheelchair braking device according to claim 1, wherein the sensing lever is pivotably mounted to the support structure so as to rotate about an axis transverse to the support structure.

5. The wheelchair braking device according to claim 1, wherein the engaging means moves in a downward direction when the sensing lever moves in the second rotational direction.

6. The wheelchair braking device according to claim 1, further comprising means for mounting the support structure to the wheelchair.

7. The wheelchair braking device according to claim 1, wherein the biasing means comprises a spring having a first end attached to the braking means and a second end attached to the support structure.

8. The wheelchair braking device according to claim 1, wherein the braking device is mounted to a wheelchair with multiple wheels, the support structure being located along one of the wheels of the wheelchair and oriented in a fore-aft direction relative to the wheelchair.

9. A wheelchair braking device comprising:
a support structure;
a sensing lever pivotably mounted to the support structure for rotational movement in oppositely-disposed first and second rotational directions, the sensing lever comprising means for engaging a wheelchair seat, the engaging means moving in upward and downward directions when the sensing lever moves in the first and second rotational directions thereof, respectively;
braking means slidably mounted to the support structure for movement in oppositely-disposed first and second linear direction, wherein the braking means comprises a block slidably coupled to the support structure and a cantilevered member mounted to and extending from the block in a transverse direction to the first and second linear directions;
means for biasing the braking means in the first linear direction; and
means for interconnecting the sensing lever and the braking means, the interconnecting means causing the biasing means to bias the sensing lever in the first rotational direction, the interconnecting means causing the braking means to move in the second linear direction when the sensing lever is caused to rotate in the second rotational direction.

10. A wheelchair having a seat, multiple wheels, and at least two braking devices, each of the braking devices comprising:
a sensing lever pivotably mounted to the wheelchair so as to rotate about a horizontal axis and so that a first end of the sensing lever is movable in upward and downward directions while contacting the seat of the wheelchair;
braking means slidably mounted relative to the wheelchair for engaging one of the wheels of the wheelchair;
means for biasing the braking means into engagement with the one wheel of the wheelchair; and
means for interconnecting the sensing lever and the braking means, the interconnecting means causing the biasing means to bias the first end of the sensing lever in the upward direction, the interconnecting means causing the braking means to move out of engagement with the one wheel when the first end of the sensing lever is caused to move in the downward direction.

11. The wheelchair according to claim 10, further comprising a support structure having oppositely-disposed first and second ends, each of the first and second ends being coupled to the wheelchair, wherein the sensing lever is pivotably mounted to the support structure so as to rotate about a horizontal axis.

12. The wheelchair according to claim 11, wherein the biasing means comprises a spring having a first end attached to the braking means and a second end attached to the support structure.

13. The wheelchair according to claim 11, wherein the braking means comprises a block slidably coupled to the support structure and a cantilevered member mounted to and extending from the block for engagement with the one wheel of the wheelchair.

14. The wheelchair according to claim 13, wherein the support structure comprises a bar located along the one wheel of the wheelchair and oriented in a fore-aft direction of the wheelchair.

15. The wheelchair according to claim 10, wherein the braking means is slidably mounted relative to the wheelchair for movement in fore and aft directions of the wheelchair.

16. The wheelchair according to claim 15, wherein the biasing means causes the braking means to move in the aft direction to engage the one wheel of the wheelchair.

17. The wheelchair according to claim 15, wherein the sensing lever and the interconnecting means are operable to cause the braking means to move in the fore direction to disengage the one wheel of the wheelchair when the first end of the sensing lever moves in the downward direction thereof.

18. The wheelchair according to claim 10, wherein the sensing lever comprises means for engaging the seat of the wheelchair, the engaging means moving in the upward and downward directions with the first end of the sensing lever.

19. The wheelchair according to claim 10, wherein the interconnecting means is a link pivotably connected at a first end thereof to the sensing lever and pivotably connected at a second end thereof to the braking means.

* * * * *